Patented Mar. 20, 1934

1,951,518

UNITED STATES PATENT OFFICE 1,951,518

PRODUCTION OF SOLID UREA OR PRODUCTS RICH IN UREA

Wilhelm Meiser, Ludwigshafen-on-the-Rhine, and Walter v. Knilling, Mannheim, Germany, assignors to I. G. Farbenindustrie Aktiengesellschaft, Frankfort-on-the-Main, Germany No Drawing. Application February 8, 1930, Serial No. 427,055. In Germany March 26, 1929

12 Claims. (Cl. 71—9)

The present invention relates to the production of solid urea or products rich in urea.

In the production of solid urea it has hitherto been usual to evaporate the solution of pure urea for example until it has a water content of about 10 per cent and to spray the solution by means of hot air with the employment of nozzles and the like, and the product thus obtained which still contains about from 3 to 4 per cent of water has been subjected to a subsequent treatment in drying drums whereby the water content is finally brought to from 0.5 to 1 per cent.

For the production of a uniformly grained product it is of advantage to employ a melt with the smallest possible content of water for the spraying, and in this case the subsequent treatment in drying drums may be dispensed with. The evaporation of the melt until almost all of the water has been removed, however, requires continuously increasing temperatures in order to maintain it in the liquid state so that a correspondingly greater decomposition of urea with the simultaneous formation of undesirable decomposition products such as biuret takes place.

We have now found that these disadvantages can be overcome and the melts can be evaporated without any decomposition until the almost completed removal of water, for example until the water content is 2 per cent or even less, by adding to the solutions or melts substances which reduce the solidification point of the anhydrous melts, preferably to 120° centigrade or less. Substances suitable for being used as additions are those substances which are soluble in water and in the anhydrous melts and which do not decompose the urea. It is preferable to employ such additional materials as simultaneously possess a fertilizing action. Suitable additions are for example diammonium phosphate, phosphoric acid, urea phosphate, potassium phosphate, monocalcium phosphate, the nitrates of potassium, sodium or ammonium, further potassium chloride, ammonium sulphate, formamide and acetamide. The amount of the additions should not exceed 15 per cent by weight of the urea. Generally speaking, additions of from 5 to 10 per cent calculated on the amount of the urea solutions are sufficient.

Particularly smooth and uniform granules are obtained by allowing the said melts to run in a thin stream into liquids kept in motion, such as carbon tetrachloride, mineral oils or the like, or by spraying them in the form of droplets into such liquids, for example by means of rotating discs or other suitable devices. The products are thus obtained in the form of smooth, hard globular granules, which can be separated from the liquid by centrifuging or the like, and which are particularly well suitable for storage and distribution.

The following examples will further illustrate the nature of this invention but the invention is not restricted to these examples.

Example 1

40 kilograms of diammonium phosphate are introduced into a solution of 400 kilograms of urea in 50 liters of water and the mixture is evaporated in vacuo until the temperature in the evaporating vessel amounts to 120° centigrade. The vacuum is regulated during the evaporation so that the boiling point does not fall below the setting point. The water content of the evaporated melt then amounts to from 0 to 2 per cent and the setting point of the completely anhydrous melt is 119° centigrade. After spraying the melt in the usual manner a completely anhydrous, uniformly grained, non-hygroscopic product is obtained which does not require a subsequent drying. The content of biuret amounts at the most to 0.2 per cent.

Example 2

20 liters of 66 per cent phosphoric acid are added to a solution of 400 kilograms of urea in 50 liters of water and the mixture is evaporated and sprayed in the manner described in Example 1. The setting point of the anhydrous melt is also below 119° centigrade in this case, and a product is obtained which does not require a subsequent drying. The content of biuret amounts to about 0.6 per cent.

Similar results are obtained by an addition of about 10 per cent of formamide or acetamide.

What we claim is:—

1. The process of converting pure solutions of urea into a solid granular form which comprises adding to the solution up to 15 per cent, by weight of the urea, of diammonium phosphate, evaporating at a temperature not exceeding 120° C. until the water content of the solution is substantially below 10 per cent, and spray-solidifying the mass.

2. The process of converting pure solutions of urea into a solid granular form which comprises adding to the solution about 10 per cent, by weight of the urea, of diammonium phosphate, evaporating at a temperature not exceeding 120° C. until the water content of the melt is not higher than about 2 per cent and spray-solidifying the mass.

3. The process of converting pure solutions of urea into a solid granular form which comprises adding to the solution up to 15 per cent, by weight of the urea, of formamide, evaporating at a temperature not exceeding 120° C. until the water content of the solution is substantially below 10 per cent, and spray-solidifying the mass.

4. The process of converting pure solutions of urea into a solid granular form which comprises adding to the solution about 10 per cent, by weight of the urea, of formamide, evaporating at a temperature not exceeding 120° C. until the water content of the melt is not higher than about 2 per cent, and spray-solidifying the mass.

5. The process of converting pure solutions of urea into a solid granular form which comprises adding to the solution about 5 liters of 66 per cent phosphoric acid for each 100 kilograms of urea, evaporating at a temperature not exceeding 120° C. until the water content of the solution is substantially below 10 per cent, and spray-solidifying the mass.

6. The process of converting pure solutions of urea into a solid granular form which comprises adding to the solution about 5 liters of 66 per cent phosphoric acid for each 100 kilograms of urea, evaporating at a temperature not exceeding 120° C. until the water content of the melt is not higher than about 2 per cent and spray-solidifying the mass.

7. The process for producing a granular dry product comprising urea and containing substantially no decomposition products of urea from a solution of pure urea which comprises adding to such a solution, in an amount not exceeding 15 per cent by weight of the urea, a compound which is soluble in water, reduces the solidification point of an anhydrous melt of urea to below 120° C., is soluble in said melt, and contains in the form of a chemical compound a substance selected from the class consisting of N, K and P, heating the resulting mixture at a temperature not exceeding 120° C. to produce a melt containing substantially below 10 per cent of water and spray-solidifying the melt.

8. The process for producing a granular dry product comprising urea and containing substantially no decomposition products of urea from a solution of pure urea which comprises adding to such a solution between 5 and 10 per cent by weight of the urea of a compound which is soluble in water, reduces the solidification point of an anhydrous melt of urea to below 120° C., is soluble in said melt, and contains in the form of a chemical compound a substance selected from the class consisting of N, K and P, heating the resulting mixture at a temperature not exceeding 120° C. to produce a melt containing substantially below 10 per cent of water and spray-solidifying the melt.

9. The process for producing a granular dry product comprising urea and containing substantially no decomposition products of urea from a solution of pure urea which comprises adding to such a solution between 5 and 10 per cent by weight of the urea of a compound which is soluble in water, reduces the solidification point of an anhydrous melt of urea to below 120° C., is soluble in said melt, and contains in the form of a chemical compound a substance selected from the class consisting of N, K and P, heating the resulting mixture at a temperature not exceeding 120° C. to produce a melt containing not more than 2 per cent of water and spray-solidifying the melt.

10. The process for producing a granular dry product comprising urea and containing substantially no decomposition products of urea from a solution of pure urea which comprises adding to such a solution between 5 and 10 per cent by weight of the urea of a compound which is soluble in water, reduces the solidification point of an anhydrous melt of urea to below 120° C., is soluble in said melt, and contains in the form of a chemical compound a substance selected from the class consisting of N, K and P, heating the resulting mixture in vacuo to about 120° C. to produce a melt containing not more than 2 per cent of water and spray-solidifying the melt.

11. The process for producing a granular dry product comprising urea and containing substantially no decomposition products of urea from a solution of pure urea which comprises adding to such a solution, in an amount not exceeding 15 per cent by weight of the urea, a compound which is soluble in water, reduces the solidification point of an anhydrous melt of urea to below 120° C., is soluble in said melt, contains a strong acid anion and in the form of a chemical compound a substance selected from the class consisting of N, K and P, heating the resulting mixture at a temperature not exceeding 120° C. to produce a melt containing substantially below 10 per cent of water and spray-solidifying the melt.

12. The process for producing a granular dry product comprising urea and containing substantially no decomposition products of urea from a solution of pure urea which comprises adding to such a solution between 5 and 10 per cent by weight of the urea of a compound which is soluble in water, reduces the solidification point of an anhydrous melt of urea to below 120° C., is soluble in said melt, contains a strong acid anion and in the form of a chemical compound a substance selected from the class consisting of N, K and P, heating the resulting mixture at a temperature not exceeding 120° C. to produce a melt containing substantially below 10 per cent of water and spray-solidifying the melt.

WILHELM MEISER.
WALTER v. KNILLING.